Oct. 27, 1925.
F. MOSSBERG
1,558,560
HAMMER ACTUATED ICE PICK
Filed Sept. 8, 1923
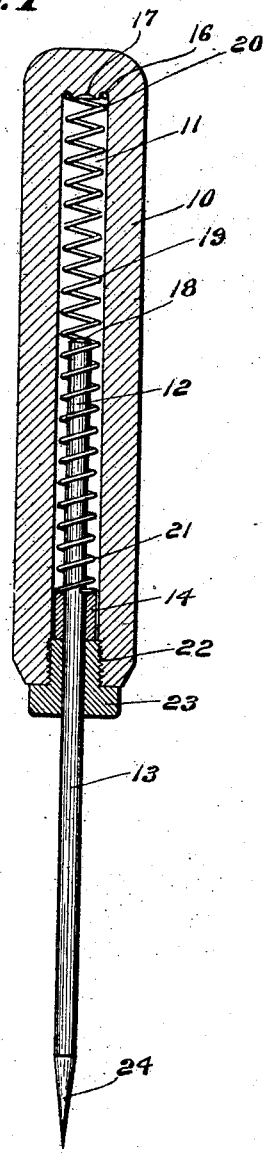
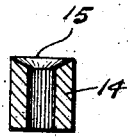
Inventor
Frank Mossberg
By Barlow & Barlow
Attorneys Patented Oct. 27, 1925.

1,558,560

UNITED STATES PATENT OFFICE.

FRANK MOSSBERG, OF ATTLEBORO, MASSACHUSETTS, ASSIGNOR TO MOSSBERG PRESSED STEEL CORPORATION, OF ATTLEBORO, MASSACHUSETTS, A CORPORATION OF MASSACHUSETTS.

HAMMER-ACTUATED ICE PICK.

Application filed September 8, 1923. Serial No. 661,680.

*To all whom it may concern:*

Be it known that I, FRANK MOSSBERG, a citizen of the United States, residing at Attleboro, in the county of Bristol and State of Massachusetts, have invented certain new and useful Improvements in Hammer-Actuated Ice Picks, of which the following is a specification.

This invention relates to an improved implement which may be used as an ice pick, prick punch, driving awl, and for various other purposes for which it may be adapted and which comprises a handle of a substantial weight having a tool shank slidably mounted therein, whereby the handle may reciprocate on the tool shank and caused to impart hammer-like blows through the tool upon the work while the tool remains in contact therewith.

With these and other objects in view, the invention consists of certain novel features of construction, as will be more fully described, and particularly pointed out in the appended claim.

In the accompanying drawings:—

Figure 1 is a sectional side elevation illustrating my improved device, the tool mounted therein and being adapted to act as an ice pick, a punch, an awl, or for other purposes for which it is adapted.

Figure 2 is a central sectional view of a collar which is connected to the shank of the tool.

Figure 3 is a tool having a blunt or unpointed operating end.

It is found in the practical construction and operation of tools and implements of this character where the tool is of light weight, to be of advantage to insert a light spring in the bore of the handle to act upon the tool to hold it in constant contact with the work during the reciprocating movement of the heavy handle in producing hammer-like blows upon the work through the tool; and the following is a detailed description of one construction of implement by which these advantageous results may be accomplished:—

With reference to the drawings, 10 designates the handle of my improved implement, which may be made of any suitable material, that shown being formed of a bar of metal having a central bore 11.

In this bore is mounted the shank portion 12 of the tool 13, the same being provided with a collar member 14 which may be secured to the shank of the tool by any suitable means. I preferably form the opening through this collar with ribbed or corrugated walls and then secure the collar to the shank by pressing the metal of the collar about the shank of the tool, which is an inexpensive and effective method of attaching the collar to the tool without weakening the tool shank.

The upper end of this collar is preferably concaved as at 15 and the upper end of the bore of the handle is preferably grooved slightly as at 16 about its outer edge forming a slight, central projection 17 concaved to receive the rounded end of the tool shank when striking a hammer-like blow through the tool on to the work.

In this bore, I have mounted a light, coiled spring 19, its upper end 20 being spread to engage the recess 16 and encircle the projection 17 in the bottom of the bore so as to hold these upper coils spread outwardly and in frictional contact with the side walls of the bore to prevent this portion of the spring from sliding downwardly during the reciprocating action of the handle, and to also hold the upper coils of the spring spread or open to them from catching the end of the tool shank as the handle is forced downwardly.

The coils at the opposite ends 21 of this spring are preferably slightly contracted to fit into the concaved end portion of the collar 14 thereby causing the end coils of this spring to hug the shank to prevent sliding thereon during the relative reciprocating action of the handle and tool.

The bore at the lower end of this handle is threaded as at 22 to receive the plug 23, which plug when screwed into position serves as a stop for the lower end of the collar 14 to limit the outward motion of the tool. The working end 24 of this tool may be made in any desired shape, it may be pointed, as illustrated in Figure 1, to serve as an ice pick, a prick-punch, a driving awl, a marker punch, or it may be used for any one of a multiplicity of purposes for which it is adapted. In other cases, the end of the tool may be blunt as illustrated in Figure 3 and magnetized, if desired, for the purpose of picking up the head of a nail to hold the same while driving it into the work, or the implement may be provided with any other style of operating tool and employed for any purpose for which it is adapted.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

An implement of the class described, comprising a handle member of a substantial weight and having a longitudinal bore, an operating tool having a shank slidably mounted in said bore, a bearing collar on said shank and fitted to slide and guide the shank in said bore, a coiled spring in said bore acting against the upper end of said handle bore and against said tool shank collar to normally hold the tool extended in the handle, an anvil projection at the upper end of said bore of a greater diameter than that of said shank and a spring spread to about engage said projection and be out of contact with said shank and its lower end contracted about the tool shank, said spring acting on said tool to hold it in contact with the work during the reciprocating action of the heavy handle in producing hammer-like blows through the tool upon the work, and a screw plug in the outer end of the handle bore through which the tool works endwise to limit the relative outward motion of the tool.

In testimony whereof I affix my signature.

FRANK MOSSBERG.